US012802581B2

(12) United States Patent
Zhou et al.

(10) Patent No.: US 12,802,581 B2
(45) Date of Patent: Nov. 17, 2026

(54) GROUNDED QUESTION ANSWERING METHOD BASED ON DYNAMIC TWO-LEVEL VISUAL INFORMATION FUSION

(71) Applicant: DALIAN UNIVERSITY, Dalian (CN)

(72) Inventors: Dongsheng Zhou, Dalian (CN); Yue Zhang, Dalian (CN); Wanshu Fan, Dalian (CN); Chao Che, Dalian (CN)

(73) Assignee: DALIAN UNIVERSITY, Dalian (CN)

( * ) Notice: Subject to any disclaimer, the term of this patent is extended or adjusted under 35 U.S.C. 154(b) by 205 days.

(21) Appl. No.: 18/675,445

(22) Filed: May 28, 2024

(65) Prior Publication Data

US 2025/0140124 A1 May 1, 2025

Related U.S. Application Data

(63) Continuation of application No. PCT/CN2023/128345, filed on Oct. 31, 2023.

(51) Int. Cl.
*G09B 5/02* (2006.01)
*G06V 10/86* (2022.01)

(52) U.S. Cl.
CPC ............... *G09B 5/02* (2013.01); *G06V 10/86* (2022.01)

(58) Field of Classification Search
CPC ........... G09B 5/02; G06V 10/86; G06V 10/82
USPC ........................................................ 434/322
See application file for complete search history.

(56) References Cited

U.S. PATENT DOCUMENTS 10,635,927 B2 * 4/2020 Chen ...................... G06V 10/82

FOREIGN PATENT DOCUMENTS

CN 114821245 A 7/2022

* cited by examiner

*Primary Examiner* — Peter S Vasat
*Assistant Examiner* — Stephen Alvesteffer
(74) *Attorney, Agent, or Firm* — HAUPTMAN HAM, LLP

(57) ABSTRACT

A ground visual question-answering method based on dynamic dual-level visual information fusion includes using a dual-level multiscale network, which is divided into language-guided pixel-level features and region-level features. These two scale branches are combined to predict the final textual answer and ground answer. Furthermore, a question-guided dynamic region-level feature localization network is proposed to locate visual information guided by the question and adaptively assign masks of different sizes to ground answers, thereby enhancing the accuracy of locating and segmenting small targets. Additionally, a cross-modal aggregation module is designed to fuse features from both levels, enhancing the fusion of pixel-level and region-level features to improve the segmentation effect of ground answer masks' edges. The ground visual question-answering system built by the language-guided adaptive dual-level feature fusion network in this invention can effectively improve the accuracy of the entire model while answering questions and generating answer ground masks simultaneously.

7 Claims, 1 Drawing Sheet

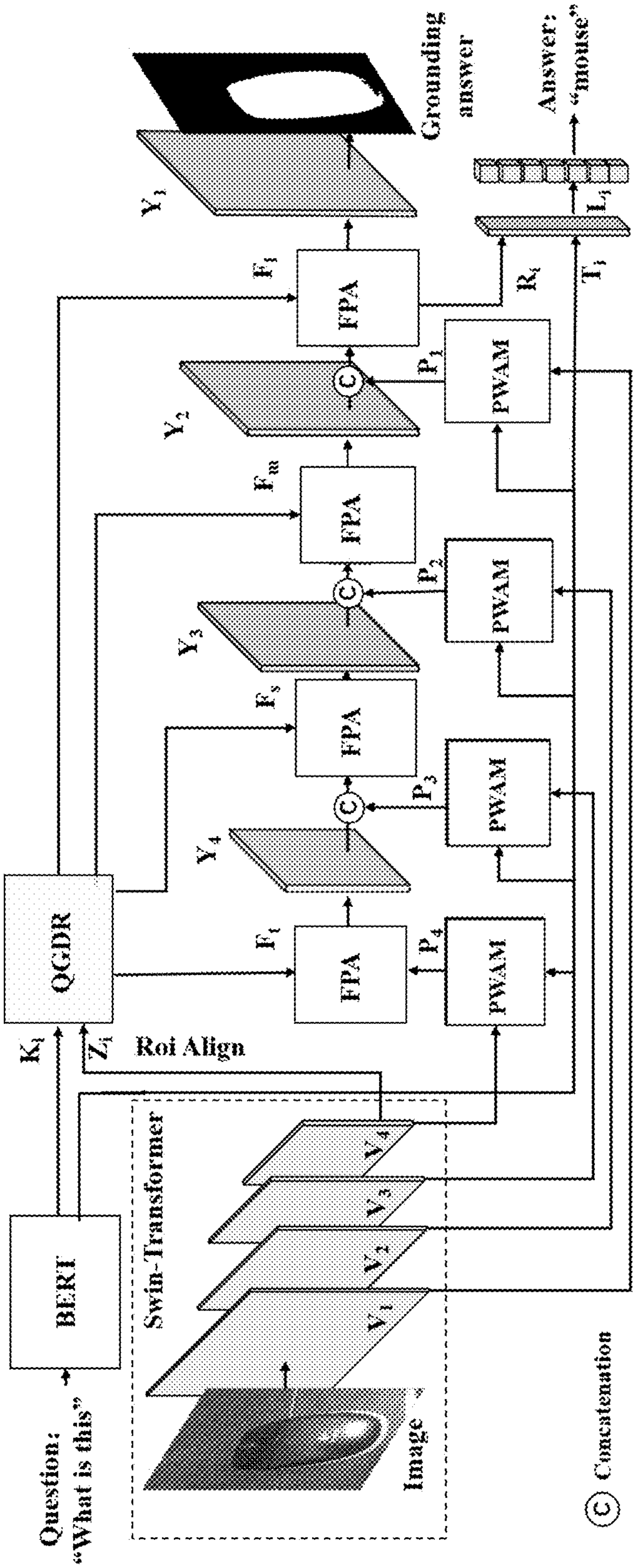
Question:
"What is this"
BERT
Swin-Transformer
Image
Roi Align
QGDR
FPA
PWAM
Grounding answer
Answer:
"mouse"
Concatenation

GROUNDED QUESTION ANSWERING METHOD BASED ON DYNAMIC TWO-LEVEL VISUAL INFORMATION FUSION

RELATED APPLICATIONS

The present application is a Continuation of International Application Number PCT/CN2023/128345 filed Oct. 31, 2023, the disclosure of which is hereby incorporated by reference herein in its entirety.

FIELD OF THE INVENTION

The present invention belongs to the field of computer vision and natural language processing technology, and specifically relates to a grounded visual question answering method based on dynamic two-level visual information fusion.

BACKGROUND OF THE INVENTION

In recent years, VQA (Visual Question Answering) technology has developed rapidly, and there are more and more practical application scenarios, such as answering questions from visually impaired patients or helping radiologists diagnose fatal diseases at an early stage, as well as human-computer interaction. As these systems become more sophisticated, the accuracy of a system that produces good answers will not be sufficient, and the validity of the answers will also be important for a variety of studies and applications. By considering the inference mechanism of the model, it is possible to provide explainable support for the answer to a certain extent. An ideal VQA system for such purposes should not only generate accurate answers, but also provide a mechanism for verifying answers.

However, the traditional VQA usually only outputs the final text answer and lacks the verification of visual evidence, so in recent years, there have been works to try to solve this problem, such as the MAC-CAPS method (capsule-based weakly supervised grounded visual question answering), which proposes to give a visual attention map at the same time as the text answer, in order to better evaluate the accuracy of the system's positioning answer. Similar methods include LXMERT (transformer-based cross-modal encoder) and DCAMN (double-capsule attention mask network with mutual learning function for visual question answering) that generate text answers and output the grounded answer area in the corresponding image region. However, these methods usually output an attention map or box related to the problem to show the ground-related area, and if an educated image grounding answer mask is provided when answering a visual question, it can be directly verified that the answer obtained is convincing, which can make the VQA system more reliable. At the same time, from the perspective of application, obtaining an image grounding mask can expand more applications, such as separating relevant content from the background in the face of questions from visually impaired people, blurring the background to protect privacy, or magnifying the relevant visual area, so that users with low vision can find the information they want faster.

Therefore, the answer grounding task is proposed, which is different from the conventional VQA task, which starts from the practical application of the visually impaired, and aims to output the mask map of the visual area corresponding to the answer while answering the text answer. For this task, DAVI (Answer Grounding Based on Dual Visual Language Interaction) is a combination of two pre-trained large models, BLIP (Guided Language Image Pre-training to Achieve Unified Visual Language Understanding and Generation) and VIT (Multimodal Framework Based on Visual and Language Research), including two encoders and two decoders combine the text-image segmentation task model and the vision-to-language generation task model, but in fact, it is equivalent to separating the two interrelated tasks of generating text answers and output ground masks into two independent tasks. However, the newly published DDTN (Grounding Visual Answer Based on Dual Decoder Transformer Network) does not use a large-scale pre-trained model, but the segmentation effect is much lower than that of DAVT.

BRIEF SUMMARY OF THE INVENTION

In view of the above-mentioned problems existing in the prior art, the invention proposes a grounded visual question answering method based on dynamic two-level visual information fusion, which can also achieve a relatively good segmentation effect without being based on a large-scale pre-trained model, and realizes the output of two answer modes under the condition of an encoder and a decoder, so that the interaction between the two modalities can be better realized.

In order to achieve the above purpose, the technical scheme of the present invention is:

The grounded visual question answering method based on dynamic two-level visual information fusion includes the following steps:

Step 1: As shown in FIG. 1, the present invention adopts a problem-guided regional-level dynamic multi-scale method to locate and segment the grounded answer, and a language-guided regional-level feature module QGDR is designed, which is composed of a cross-attention module and a spatial attention module, and finally obtains a region-level mask prediction feature $F_i \in F_t$, $F_s$, $F_m$, $F_l$ with a resolution from small to large; wherein $F_t$, $F_s$, $F_m$, $F_l$ are four types of regional feature hierarchies, and the spatial resolution from $F_t$ to $F_l$ is increased by two times layer by layer;

Step 2: In order to reduce computational overhead while maintaining performance, a dynamic approach is adopted to adaptively assign a mask of the appropriate resolution size to each anchored object, and budget limits are imposed on resource consumption. The QGDR output has four different switching states, corresponding to four different mask resolutions, namely [14×14,28×28,56×56,112×112];

Step 3: In order to better integrate the features of the two levels, a cross-modal multi-scale fusion module FPA is designed to aggregate the feature Fi and Pi output by the language-guided pixel-level feature module PWAM and the language-guided region-level feature module QGDR;

Step 4: construct an information flow between each level of the language-guided pixel-level feature module PWAM and the language-guided regional-level feature module QGDR, perform hierarchical and step-by-step decoding, and finally obtain the grounding answer and the text answer obtained by the image segmentation decoder and the text decoder;

Step 5: load the model in step 4, input the required image and its corresponding question into the trained grounded visual question answering model, and obtain the corresponding grounded answer and text answer;

Based on the above scheme, the method adopts multi-scale information fusion, which can better understand and process visual information at different scales, which is helpful to improve the understanding and localization of complex scenes, thereby improving the accuracy of question answering. In this method, an adaptive resolution mask allocation is adopted, which dynamically allocates a mask of appropriate resolution size according to the needs of each positioning object, which can improve the efficiency of resource utilization while maintaining high-resolution processing of critical areas. By introducing the cross-modal multi-scale fusion module, the multi-scale aggregation of language-guided pixel-level features and region-level features can better combine text information and image information, and improve the comprehension of questions and the ability to generate answers. The hierarchical and step-by-step decoding method is used to decode the information from pixel-level features to region-level features and then to the final answer, which helps to better capture the detailed information in the image and associate it with the question, which improves the accuracy of Q & A. Multiple loss functions, including mask loss, edge loss, budget constraints, and text loss, are used to consider different aspects of the goal to better train the model and improve the performance of the model. This method can be applied to grounded visual question answering, providing an efficient and accurate method for machines to understand images and answer questions, and has the potential to be applied to various fields, such as autonomous driving, medical image analysis, image retrieval, etc.

Further, step 1 specifically comprises:

Step 1.1: First, the ROI-aligned regional features $Z_i$ extracted from the swin-transformer are averaged and pooled to $\overline{Z}_I$, combined with the problem feature $K_i$ extracted from BERT. Input $\overline{Z}_I$ and $K_i$ into cross-modal attention, which can be regarded as injecting the word attention in the problem into different visual channels to guide visual localization and promote the complementarity and enhancement of multimodal information. where T represents the transpose operation, after two linear transformations, the specific formula is as follows:

$$Q_i = softmax\left(\frac{\overline{Z_i K_i^T}}{\sqrt{D_i}}\right)\hat{K}_I \;\; A = \pi r^2 \tag{1}$$

Where $Q_i$ represents the attention weight, $d_i$ represents the length of the $\overline{Z}_i$ and $\overline{K}_i$ vectors, and $\hat{K}_I$ represents the vector generated by the linear transformation of the problem features;

Step 1.2: Perform a global pooling operation on the obtained $Q_i$ to obtain the information weight $\overline{Q}_i \in R^{C\times 1\times 1}$. It is fed into the attention module SE-block to weight the different channels of visual information used for screening. Then, several convolutional and fully connected layers are used for classification, and the region-level mask prediction feature $F_i$ of different sizes is obtained. The specific formula is as follows:

$$F_i = \mathcal{F}\left(conv\left(F_{ex}\left(\overline{Q_i}, w\right)\right)\right) \tag{2}$$

Where $\mathcal{F}$ represents the Flattehen operation, $F_{ex}$ represents the operation in the SE-block block, and w represents the weight; the specific formula for the $F_{ex}$ operation is as follows:

$$F_{ex} = \delta\left(w_2\rho\left(w_1\overline{Q_l}\right)\right) \tag{3}$$

Where δ represents the sigmoid function, ρ represents the ReLU function, $$w_1 \in R^{\frac{C}{r}\times C} \text{ and } w_2 \in R^{C\times\frac{C}{r}}.\; R^{\frac{C}{r}\times C}$$

represents the weight matrix dimension.

Further, the step 2 specifically comprises:

The QGDR module is actually a lightweight classifier designed to select the best mask resolution from k candidate targets at different scales for accurate localization and segmentation of the grounded answer with minimal resource cost. QGDR divides $F_i$ into four categories: regional feature hierarchy $F_r$, $F_s$, $F_m$, $F_l$, and the spatial resolution is increased by two times from $F_t$ to $F_l$. And by performing the softmax operation, the probability vector is output $\varepsilon^k = [\varepsilon^1, \ldots, \varepsilon^k]$. Each element of this probability vector represents the probability that the corresponding candidate resolution will be selected. The soft output $\varepsilon^k$ of the QGDR should be converted into a single thermal prediction, expressed as $H=[h_1, \ldots, h_k]$. This process can be accomplished by discrete sampling, followed by the backpropagation of the gradient using Gumbel-Softmax to update the QGDR. The specific formula is as follows:

$$h_i = \frac{\exp\left(\left(\log\varepsilon^k + g_{i)/\tau}\right)\right.}{\Sigma_{k'}\exp\left(\left(\log\varepsilon^{k'} + g_{i)/\tau}\right)\right.} \tag{4}$$

Where τ is a parameter, and when τ is close to 0, Gumbel-softmax is close to the one-hot. $g_i$ denotes the Gumbel distribution, and $\varepsilon^{k'}$ denotes k' discrete probability vectors.

Further, the step 3 specifically comprises:

After being processed by the question-guided Pixel-Level Feature Module (PWAM) and the question-guided Region-Level Feature Module (QGDR), the modal fusion features $P_i \in R^{C_i \times H_i \times W_i}$ and $F_i \in R^{C\times H\times W}$ are obtained. Next, the output of these two modules needs to be aggre-gated at multiple scales. Due to the upsampling and ROI pooling operations in these two modules, there exists spatial misalignment between $F_i$ and $P_i$. In order to enhance the segmentation performance of boundary regions, this paper proposes a module called FPA that adaptively aggregates multi-scale features. As shown in the FIG. 1, FPA consists of a deformable convolution and a dynamic convolu-tion. Firstly, $F_i$ is upsampled through deconvolution. Then, $F_i$ is concatenated with $P_i$, and the concatenated features are fed into a 3×3 convolution to obtain the offset mapping, represented by ΔO. Finally, $F_i$ is aligned with $P_i$ using the learned offset value o, and the position of $F_i$'s out-put from QGDR is adjusted through deformable convolu-tion (Deform conv1) to better align with the output $P_i$ from PWAM. The specific formula is as follows:

$$O_i = \Phi[conv(\rho(F_i) \| P_i)] \quad (5)$$

Where ρ denotes the Deconv operation, Φ denotes the Deform conv1 operation, and || is the concatenate operation.

Step 3.2: After the Deform conv1 operation, $O_i$ is added to $P_i$. Then after 1×1 convolution the output channel is realized as C. Finally, it is passed through CondConv which is similar to the attention mechanism and it serves to pay more attention to the salient parts of the object. The trans-membrane multi-scale aggregation module, The FPA is inserted into different stages of the Swin-Transformer de-coding and plays a crucial role in improving grounded answer mask prediction. The specific formula is as follows:

$$Y_i = \psi(conv_{1\times 1}(O_i + P_i)) \quad (6)$$

Where $Y_i$ denotes the regional feature and Ψ denotes the CondConv operation.

Further, the step 4 is specifically as follows:

The QGDR dynamically locates the grounded answer in the image by a language-guided image and provides a grounded answer mask assigned different resolutions for different aggregation stages. The cost of computing resources is reduced while ensuring accuracy, so three loss functions are used to train the dynamic multi-scale module.

Step 4.1: Given a VQA instance, we first predict its mask switching state $H=[h_1, \ldots, h_k]$ by QGDR, and obtain a group of mask prediction maps at K different resolutions $$\{m_i^1, \ldots, m_i^k\}$$

by passing this instance through different stages of decoding. The mask loss function is defined as follows:

$$\mathcal{L}_m = \sum\nolimits_{i=1}^{N}\sum\nolimits_{k=1}^{K} h_i C(m_i^k, \hat{m}_i) \quad (8)$$

Where N denotes N different instances, $$m_i^k$$

denotes the k-th mask prediction ground truth answer, and $\hat{m}_i$ represents its corresponding ground truth mask grid, h; is the indicator for whether the k-th mask resolution is selected as the output resolution. $\mathcal{C}$ is defined as the binary cross-entropy loss in this paper.

Step 4.2: The second is edge loss, for the masks generated by QGDR, dynamic selection is performed. It is commonly believed that the size of mask loss can be used as a measure of mask quality. However, the mask losses generated on different masks are very close, making it difficult to distin-guish mask quality. In contrast, there is a larger difference in edge loss generated by masks of different resolutions, which can better reflect the quality of the mask. Therefore, this paper adopts edge loss as a measure of mask quality. Given the output $F=[f_1, \ldots, f_k]$ of QGDR and the edge mapping at different resolutions represented as $$\{e_i^1, \ldots, e_i^k\},$$

the edge loss is defined as follows:

$$\mathcal{L}_e = \sum\nolimits_{i=1}^{N}\sum\nolimits_{k=1}^{K} h_i C(e_i^k, \hat{e}_i) \quad (8)$$

Where $$e_i^k$$

denotes the ground-truth answer edge, which is generated by first applying the Laplacian operator on the ground-truth answer mask $\hat{m}_i$ to obtain a soft edge map, and then converting it into a binary edge map by thresholding.

Step 4.3: The QGDR module is optimized by the edge loss in formula 4.2, but there is a problem with the model converging to a suboptimal solution, where all instances are segmented with the highest resolution mask because it contains more detailed information and thus results in mini-mal prediction loss. However, experiments have proven that not all samples require segmentation with the maximum mask. In order to avoid the aforementioned problem, improve model efficiency, and reduce computational com-plexity, this paper adopts budget constraints to train QGDR. Specifically, let C represent the corresponding computa-tional cost for the selected mask resolution. A penalty is added to the model when the expected deviation (E(C)) from the current batch data exceeds the target deviation (repre-sented as $C_t$) in order to control the computational cost.

$$\mathcal{L}_b = \max\left(\frac{E(C)}{C_t} - 1, 0\right) \quad (11)$$

Step 4.4: The final total objective function for the grounded answer branch is obtained as follows, where $\lambda_1$ and $\lambda_2$ are the trade-off hyper-parameters:

$$\mathcal{L}_t = \mathcal{L}_m + \lambda_1\mathcal{L}_e + \lambda_2\mathcal{L}_b \quad (12)$$

Finally, the question features and visual features are combined through the elemental product for classification via the Softmax function. This network is trained with binary cross entropy loss function for both text answers and PWAM.

Further, the step 5 specifically comprises:

Load the model best trained in step 4, input images and corresponding questions into the model, and output answers and corresponding evaluation indicators.

Beneficial effects of the present invention: The invention proposes a grounded visual question answering method based on dynamic two-level visual information fusion, which constructs a multi-level direct flow from pixel-level features to region-level features, thereby promoting the complementary information aggregation of multi-level features. Specifically, the present invention provides a problem-oriented dynamic region-level module, which can effectively locate region-level objects according to the problem, and dynamically select masks of different resolutions, so as to realize the characteristics of the language guidance object level multi-scale feature fusion. In addition, the invention proposes a cross-modal multi-scale fusion module, which is guided by the language in the image, adaptively aggregates pixel-level information and region-level content, so as to realize the interaction and fusion of multi-modal information from different levels, realizes high-quality information interaction, and effectively improves the accuracy of the whole model.

BRIEF DESCRIPTION OF THE DRAWINGS

FIG. 1 is a framework diagram of the dynamic dual-level vision transformer fusion network for answer grounding in visual question answering.

DETAILED DESCRIPTION OF THE PREFERRED EMBODIMENTS

The embodiments of the present invention are implemented under the premise that the technical scheme of the present invention is given, and a detailed embodiment and a specific operation process are given, but the scope of protection of the present invention is not limited to the following embodiments.

This invention provides a grounding visual question answering method based on dynamic dual-level visual information fusion, which constructs a grounding visual question answering system through a dual-level multiscale network, namely divided into language-guided pixel-level features and region-level features. These two scale branches are combined for the final text answer and grounding answer prediction. Additionally, a question-guided dynamic region-level feature localization network is proposed to locate visual information guided by questions and adaptively allocate masks of different sizes to the grounding answers, improving the accuracy of locating and segmenting small targets. Furthermore, a cross-modal aggregation module is designed to fuse features from both levels, enhancing the feature fusion between pixel-level and region-level features to improve the segmentation effect of grounding answer masks' edges. The grounding visual question answering system built by the language-guided adaptive dual-level feature fusion network in this invention can generate answer grounding masks while answering questions, effectively improving the overall model accuracy.

Example 1

The embodiment takes the Windows system as the development environment, Pycharm as the development platform, and Python as the development language, and adopts the grounded visual question answering method based on dynamic two-level visual information fusion of the present invention to complete the grounding answer prediction of the picture taken by the visually impaired person and its related questions.

In this embodiment, the visual question answering method based on dynamic dual-level visual information fusion comprises the following steps:

Step 1: Load the pre-trained weights of Swin Transformer and BERT encoders in the DDVT network into the grounding visual question answering network as illustrated in FIG. 1.

Step 2: Input the 'image-question-grounded answer' pairs from the training set into the grounding visual question answering network from Step 1 for training.

Step 3: Input the required images along with their corresponding questions, load the network model saved after training in Step 2, and obtain the corresponding grounding answers as well as the respective evaluation metrics. This invention utilizes the Intersection over Union (IoU), which is the overlap area between the model's predicted segmentation and the ground truth segmentation divided by the union area of the predicted segmentation and the ground truth segmentation, as the evaluation metric. Its calculation can be represented by formula (16), where $S_i$ and $S_u$ represent the predicted segmentation answer and the ground truth label answer, respectively.

$$IOU = \frac{S_i \cap S_u}{S_i \cup S_u} \tag{16}$$

Based on the above steps, this invention compares the LXMTRT model, Mac-Caps model, UNIFIED model, DDVT model, and other models such as MCAN. From Table 1, it can be observed that the method proposed in this invention generally outperforms other methods in terms of accuracy on two commonly used test sets.

TABLE 1

Results of the Comparison with state-of-the-art methods on the VizWizGround test set and VQS val set.

| | | IOU | |
|---|---|---|---|
| Methods | 预训练 | VizWizGroundVQA | VQS |
| LXMTRT | 是 | 22.09 | — |
| Mac-Caps | 否 | 27.3 | — |
| UNIFIED | 是 | 54.7 | — |
| DDVT | 否 | 53.4 | — |
| DFAF | 否 | — | 17.5 |
| MCAN | 否 | — | 23.91 |
| BUTD | 否 | — | 33.97 |
| SDCAM | 否 | — | 37.93 |
| DDVT(ours) | 否 | 65.3 | 43.47 |

The foregoing description of specific exemplary embodiments of the present invention is provided for the purpose of illustration and explanation. These descriptions are not intended to limit the invention to the precise forms disclosed, and it is apparent that many changes and variations can be made based on the teachings provided above. The purpose of selecting and describing exemplary embodiments is to explain the specific principles of the invention and its practical application, thereby enabling those skilled in the art to implement and utilize various different exemplary embodiments of the invention, as well as various different choices and changes. The scope of the invention is defined by the claims and their equivalents.

What is claimed is:

1. A ground visual question-answering method based on dynamic dual-level visual information fusion, comprising:

a question-guided dynamic multi-scale approach for locating and segmenting ground answers, comprising a language-guided region-level feature module (QGDR), wherein the QGDR comprises a cross-attention module and a spatial attention module, and yields region-level mask prediction features denoted as $F_i \in \{F_t, F_s, F_m, F_l\}$, with resolution increasing from small to large, and wherein $F_t$, $F_s$, $F_m$, $F_l$ represent four classes of region features with spatial resolution doubling at each successive level;

dynamic assignment of mask resolutions to each localized object while managing resource consumption, wherein the QGDR outputs four different switch states corresponding to four different mask resolutions of 14×14, 28×28, 56×56, and 112×112;

a cross-modal multi-scale fusion module (FPA) configured to aggregate features from a language-guided pixel-level feature module (PWAM) and the language-guided region-level feature module (QGDR) at multiple scales;

information flows constructed between each level of the PWAM and each level of the QGDR to perform hierarchical decoding, wherein the ground answers are obtained via an image segmentation decoder and textual answers are obtained via a text decoder, and wherein a ground visual question-answering model comprising dual-level feature branches is trained using a combination of mask loss, edge loss, budget constraints, and text loss; and loading the trained ground visual question-answering model, inputting images and corresponding questions, and obtaining corresponding ground answers and textual answers.

2. The ground visual question-answering method based on the dynamic dual-level visual information fusion according to claim 1, wherein the question-guided dynamic multi-scale approach comprises:

performing average pooling on region features $Z_i$ extracted from a Swin Transformer decoder for region-of-interest alignment to obtain $\overline{Z}_l$, and inputting $\overline{Z}_l$ together with question features $K_i$ extracted from BERT into a cross-modal attention module, wherein attention weights $Q_i$ are computed as:

$$Q_i = \text{softmax}\left(\frac{\overline{Z}_i \overline{K}_i^T}{\sqrt{d_i}}\right)\hat{K}_i \tag{1}$$

where $d_i$ represents a length of vectors $\overline{Z}_i$ and $\overline{K}_i$, and $\hat{K}_i$ represents a linearly transformed version of the question features; and performing global pooling on $Q_i$ to obtain information weights $\overline{Q}_l$, inputting $\overline{Q}_l$ into a squeeze-and-excitation block to weight different channels of visual information, and applying convolutional and fully connected layers to obtain region-level mask prediction features $F_i$, wherein:

$$F_i = \mathcal{F}\left(conv\left(F_{ex}\left(\overline{Q}_i, w\right)\right)\right) \tag{2}$$

where F represents a flattening operation, $F_{ex}$ represents operations within the squeeze-and-excitation block, and w represents weights, and wherein:

$$F_{ex} = \delta\left(w_2\rho\left(w_1\overline{Q}_1\right)\right) \tag{3}$$

where δ represents a sigmoid function, ρ represents a ReLU function, and $w_1 \in$ $$R^{\frac{C}{r}\times C} \text{ and } w_2 \in R^{C\times\frac{C}{r}};\ R^{\frac{C}{r}\times C}$$

represent weight matrices.

3. The ground visual question-answering method based on the dynamic dual-level visual information fusion according to claim 1, wherein the dynamic assignment of mask resolutions comprises:

using the QGDR as a lightweight classifier to select an optimal mask resolution from k candidate scales, wherein the QGDR divides $F_i$ into a hierarchical structure of four classes of region features $F_t$, $F_s$, $F_m$, $F_l$ with spatial resolution increasing by a factor of two from $F_t$ to $F_l$, and computes a probability vector $\varepsilon^k=[\varepsilon^1, \ldots \varepsilon^k]$ via a softmax operation, each element representing a probability of selecting a corresponding candidate resolution;

transforming the probability vector $\varepsilon^k=[\varepsilon^1, \ldots, \varepsilon^k]$ int into a one-hot prediction $H=[h_1, \ldots, h_k]$ via discrete sampling; and updating the QGDR via gradient backpropagation using Gumbel-Softmax, wherein:

$$h_i = \frac{\exp\left(\left(\log\varepsilon^k + g_i\right)/\tau\right)}{\sum_{k'}\exp\left(\left(\log\varepsilon^{k'} + g_i\right)/\tau\right)} \tag{4}$$

where τ is a parameter; as it approaches 0, the Gumbel-Softmax approaches one-hot encoding; $g_i$ represents a Gumbel distribution, and $\varepsilon^{k'}$ represents k' discrete probability vectors.

4. The ground visual question-answering method based on the dynamic dual-level visual information fusion according to claim 1, wherein the cross-modal multi-scale fusion module (FPA) is configured to:

after processing image and question modalities through the PWAM and the QGDR to obtain cross-modal fusion features $P_i \in R^{C_i\times H_i\times W_i}$ and F; E $R^{C\times H\times W}$, aggregate outputs of the two modules at multiple scales, wherein the FPA comprises deformable convolution and dynamic convolution, and wherein $F_i$ is upsampled via deconvolution, concatenated with $P_i$, passed through a 3×3 convolution to obtain an offset map ΔO, and aligned with $P_i$ using the deformable convolution based on learned offsets o, wherein:

$$O_i = \phi[conv(\rho(F_i)\|P_i)] \tag{5}$$

where ρ represents deconvolution, ϕ represents the deformable convolution, and || represents concatenation; and add $O_i$ to $P_i$, apply a 1×1 convolution to obtain an output channel dimension C, and insert the FPA into different stages of the Swin Transformer decoder via conditional convolution, wherein:

$$Y_i = \psi(conv_{1\times1}(O_i + P_i)) \tag{6}$$

where $Y_i$ represents region features, and $\psi$ represents conditional convolution.

5. The ground visual question-answering method based on the dynamic dual-level visual information fusion according to claim 4, wherein the mask loss is defined as:

predicting, via the QGDR, different resolution mask switching states $H=[h_1, \ldots, h_k]$, and transmitting the states through the FPA module to different stages of a decoder to obtain a set of K mask prediction images $$\{m_i^1, \ldots, m_i^k\},$$

wherein the mask loss function is:

$$\mathcal{L}_m = \sum_{i=1}^{N} \sum_{k=1}^{K} h_i \cdot C(m_i^k, \hat{m}_i) \tag{7}$$

where N represents different instances, $$m_i^k$$

represents a k-th predicted ground answer mask, $\hat{m}_i$ represents the corresponding ground truth answer mask, $h_i$ indicates selection of a k-th mask resolution, and C represents binary cross-entropy loss.

6. The ground visual question-answering method based on the dynamic dual-level visual information fusion according to claim 5, wherein the edge loss is defined as:

given the output $F=[f_1, \ldots, f_k]$ of the QGDR and edge maps at different resolutions $$\{e_k^1, \ldots, e_i^k\},$$

the edge loss is:

$$\mathcal{L}_e = \sum_{i=1}^{N} \sum_{k=1}^{K} h_i C(e_i^k, \hat{e}_i) \tag{8}$$

where $$e_i^k$$

represents ground truth answer edges obtained by applying a Laplacian operator on the ground truth answer mask $\hat{m}_i$ to obtain a soft edge map, followed by thresholding to convert to a binary edge map.

7. The ground visual question-answering method based on the dynamic dual-level visual information fusion according to claim 6, wherein the budget constraint and text loss are defined as:

using a budget constraint to train the QGDR, wherein C denotes a computational cost corresponding to a selected mask resolution, and a penalty is added when an expectation deviation E(C) exceeds a target deviation $C_t$ during computation on current batch data, wherein:

$$\mathcal{L}_b = \max\left(\frac{E(C)}{C_t} - 1, 0\right) \tag{9}$$

an overall objective function for the ground answer branch is:

$$\mathcal{L}_t = \mathcal{L}_m + \lambda_1 \mathcal{L}_e + \lambda_2 \mathcal{L}_b \tag{10}$$

where $\lambda_1$ and $\lambda_2$ are balancing hyperparameters; and combining question features and visual features via element-wise multiplication, classifying using a softmax function, and training using the binary cross-entropy loss with the textual answer and PWAM.

* * * * *